United States Patent
Ngan

(10) Patent No.: US 7,336,961 B1
(45) Date of Patent: Feb. 26, 2008

(54) METHOD AND SYSTEM FOR DETERMINING LOCATION OF A MOBILE STATION WITHIN A DISTRIBUTED ANTENNA SYSTEM

(75) Inventor: John Cheong-Wai Ngan, Shawnee, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 439 days.

(21) Appl. No.: 10/861,612

(22) Filed: Jun. 4, 2004

(51) Int. Cl.
*H04Q 7/20* (2006.01)

(52) U.S. Cl. .................. 455/456.1; 455/140; 455/562.1

(58) Field of Classification Search ............ 455/456.1, 455/456.2, 456.3, 456.5, 456.6, 457, 132, 455/140, 226.1, 272, 275, 562.1
See application file for complete search history.

(56) References Cited

U.S. PATENT DOCUMENTS

| | | | | |
|---|---|---|---|---|
| 5,960,350 | A | * | 9/1999 | Schorman et al. .......... 455/450 |
| 6,532,359 | B1 | * | 3/2003 | Lin .......................... 455/277.1 |
| 6,952,181 | B2 | * | 10/2005 | Karr et al. .................. 342/457 |
| 2002/0160737 | A1 | * | 10/2002 | Crawford .................... 455/272 |
| 2004/0224637 | A1 | * | 11/2004 | Silva et al. ................. 455/63.4 |
| 2005/0032531 | A1 | * | 2/2005 | Gong et al. ............... 455/456.5 |
| 2005/0085239 | A1 | * | 4/2005 | Cedervall ................. 455/456.1 |
| 2005/0143091 | A1 | * | 6/2005 | Shapira et al. ........... 455/456.1 |
| 2005/0153705 | A1 | * | 7/2005 | Gramakov et al. ....... 455/456.1 |
| 2005/0186969 | A1 | * | 8/2005 | Lohita ..................... 455/456.3 |
| 2006/0025158 | A1 | * | 2/2006 | Leblanc et al. .......... 455/456.2 |

OTHER PUBLICATIONS

S. G. M. Koo, C. Rosenberg, H. -H. Chan, and Y. C. Lee. Location Discovery in Enterprise-based Wireless Networks: Implementation and Applications. In Proceedings of the 2nd IEEE Workshop on Applications and Services in Wireless Networks (ASWN 2002), Paris, France, Jul. 3-5, 2002.

* cited by examiner

*Primary Examiner*—Blane J. Jackson

(57) ABSTRACT

According to an embodiment, a distributed antenna system (DAS) is provided with functionality for determining the location of a mobile station within the DAS. The DAS may be of the type that includes a plurality of antennas located within a multi-floor building, each antenna radiating to define a respective coverage area in which the mobile station can communicate. The antennas are communicatively linked with a controller, and the controller communicates over an air interface with a radio access network so as to provide connectivity between the antennas and the radio access network. In operation, the system may determine that a given one of the antennas has received a strongest signal from the mobile station, and may transmit an indication of the geographic coverage area of the given antenna into the radio access network, as a representation of the location of the mobile station.

22 Claims, 12 Drawing Sheets

METHOD AND SYSTEM FOR DETERMINING LOCATION OF A MOBILE STATION WITHIN A DISTRIBUTED ANTENNA SYSTEM

BACKGROUND

1. Field of the Invention

The present invention relates to wireless communications, and more particularly, to a mechanism for processing location information.

2. Description of Related Art

Wireless communication is an increasingly popular means of communication in the modern world. People are using wireless networks for the exchange of voice and data as an alternative to using a wired infrastructure. In principle, a user can seek information over a packet data network such as the Internet or call anyone over a public switched telephone network (PSTN) from any place inside a coverage area of a wireless network.

In a typical wireless network, an area is divided geographically into a number of cell sites, each defined by one or more radiation patterns created by an emission of radio frequency (RF) electromagnetic waves from a respective base transceiver station (BTS) antenna. For wireless communications, RF signals are not sent through a transmission line and, therefore, antennas are required for the transmission and reception of the signals.

Unfortunately, however, buildings, tunnels, land masses, or other areas that block RF signals may obstruct the transmission and reception of RF signals. To overcome this problem, a distributed antenna system (DAS) may be used to bring RF coverage inside and throughout a facility, underground (for example, within tunnels), or anywhere that outdoor RF signals do not reach.

A DAS may comprise, for example, any network of components that receives an input RF signal, converts it to a wired signal (e.g. electrical, optical, etc.) or another wireless media, transports it throughout a facility, and then re-converts it back to an RF signal for transmission inside the facility. By way of example, a DAS may comprise multiple antennas positioned throughout a building (or other RF-blocked areas), interconnected through remote hubs using fiber-optic cables. The DAS may also include a distributed antenna system controller (DASC) connected to the remote hubs using, for example, fiber-optic cables. The DASC receives wireless signals from a BTS and converts the wireless signals into optical signals. The fiber optic cables then distribute the optical signals from the DASC to the remote hubs, which send the signals to the antennas throughout the building. The antennas receive the optical signals and convert them back to RF signals for wireless transmission inside the building. In addition to communications functionality, mobile stations (such as cellular telephones) can provide location information. For example, a cellular telephone with GPS functionality may provide a network or a user of the telephone with coordinates of the current location of the mobile station. Additionally, in wide-area (not in-building) cellular networks, a mobile station can be located by location triangulation using angle of arrival (AOA) and/or time difference of arrival (TDOA).

The usefulness of these systems is less than promising at an in-building setting (or within a set of buildings). GPS, for example, has significant signal attenuation because of building structures and, in addition, does not have multi-floor functionality. In a multi-floor building, such as a high-rise building, for instance, GPS cannot accurately distinguish between the location of a first device on a first floor and the location of a second device on a second floor.

AOA and TDOA involve complex calculations and more specialized network equipment. Further, due to the nature of indoor environments, AOA technology cannot be used reliably to compute the position of a mobile station. Signal reflection, for example, can create significant problems for an indoor AOA system. Also, TDOA technology requires very fine grained time synchronization between the transmitter and receiver, which is not feasible with current off-the-shelf mobile devices.

SUMMARY

In light of the preceding issues, a method and system is provided for generating mobile station location information in a local wireless network. According to an exemplary embodiment, a distributed antenna system has a plurality of antennas—each radiating to define a respective geographic coverage area for communicating with a mobile station (such as a cellular telephone). The antennas are communicatively linked with a local antenna controller (LAC), and the LAC communicates over a (cellular) air interface with a radio access network to provide connectivity between the antennas and the radio access network.

During operation of the mobile station, several of the antennas may be able to simultaneously receive signals from the mobile station. According to a method of operation of the exemplary system embodiment, the signals received by the antennas are used to determine the location of the mobile station. The method includes 1) determining which of the antennas has received a strongest signal from the mobile station; and 2) transmitting into the radio access network an indication of the geographic coverage area of the antenna with the strongest signal as a representation of the location of the mobile station.

In the exemplary embodiment, the distributed antenna system is distributed throughout a multi-floor building, although the embodiment may be configured to a single-floor building or other location. The indication of the geographic coverage area of each antenna may include one or more floors within the building. Additionally, the indication may contain additional information such as, for example, location on the floors and/or map location.

In an alternative method of operation, a subset of the antennas receives a signal from the mobile station. The strength of each signal received by each antenna is measured, and the strengths are compared to one another. From the comparison, the antenna with the strongest signal is identified. An indication of the geographic coverage area of the antenna with the strongest signal is established as a representation of the location of the mobile station, and the indication is transmitted into the radio access network. According to an embodiment, several of the functions of this method are carried out at the LAC.

In a further embodiment, a request for a report of the location of a given mobile station is received at the LAC from a requestor. According to this embodiment, the LAC replies with an indication of the geographic coverage area of the antenna receiving the strongest signal from the mobile station.

This summary is intended to disclose a general notion an embodiment and is not written as limiting. Further explanations, as well as variations and additional embodiments are provided by the drawings, detailed description and claims.

DETAILED DESCRIPTION

1. Overview

Figure 1:
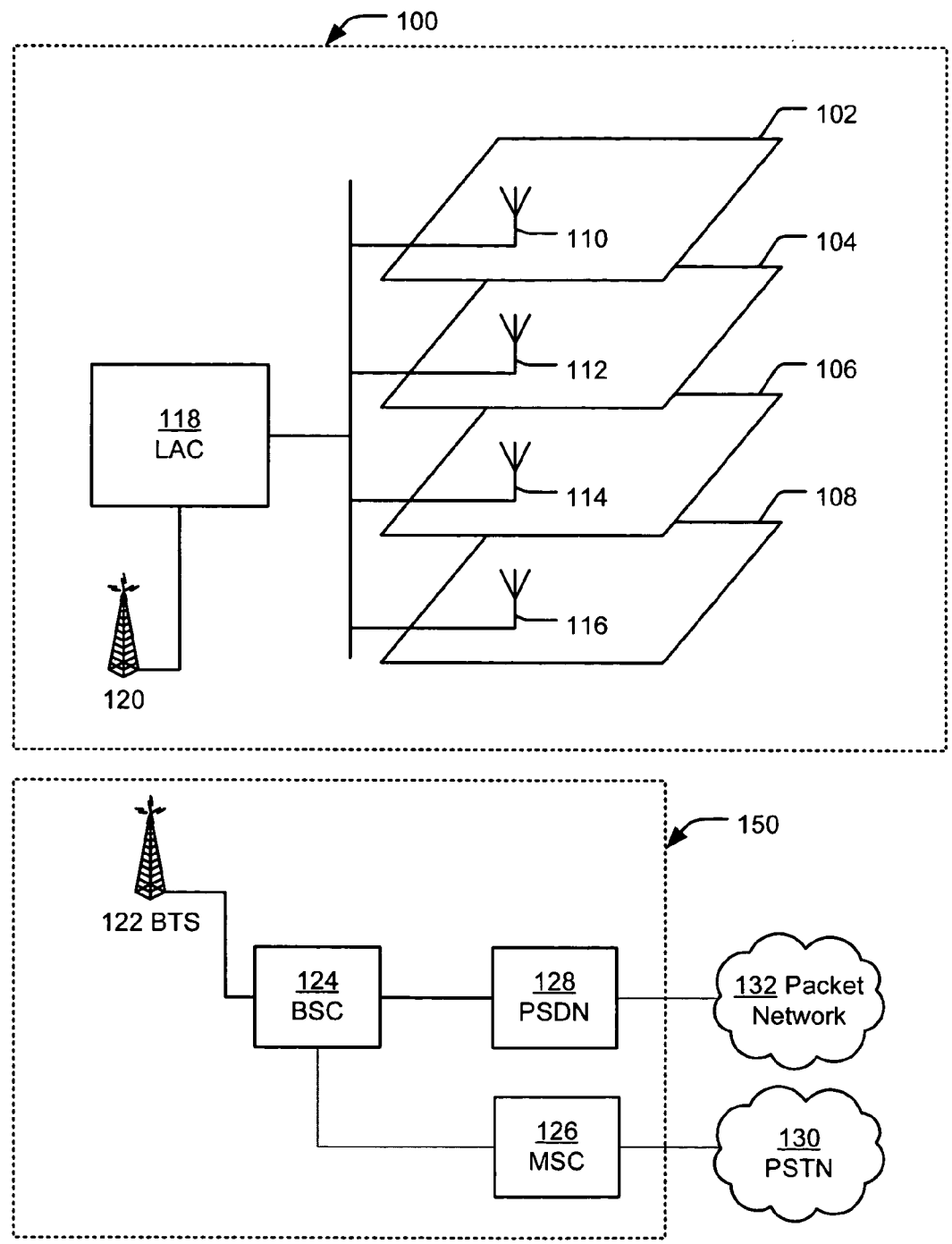
FIG. 1 is a block diagram illustrating components of an exemplary local wireless network.

Referring to the drawings, FIG. 1 is a block diagram illustrating components of a local cellular radio communications system (local wireless network) 100. In the local wireless network 100, an area is divided geographically into a number of local coverage areas 102-108. Each local coverage area 102-108 can be defined by a radio frequency (RF) radiation pattern from an associated antenna 110-116. As shown, each local coverage area 102-108 is located on a different floor within a multi-floor building. Thus, for example, a first local coverage area 108 may be located on a first floor of the building. A first antenna 116 is associated with the first coverage area 108 such that a mobile station (such as a cellular phone or wireless PDA) located within the first coverage area 108 has a communication link that passes through the first antenna 116. Each antenna 110-116 can transmit and receive wireless communications to and from a plurality of mobile stations or stationary devices such as computers or printers.

Each antenna 110-116 is shown connected to a local antenna controller (LAC) 118. The connections may take several forms including, for example, a direct connection, a connection through a bus (as shown), an Ethernet connection, or a wireless network connection (such as WiFi 802.11). As its name suggests, the LAC 118 can function to control communications passing through the antennas 110-116. For instance, in some arrangements, a LAC 118 may control the power level of wireless signals emitted by an antenna 110-116 and might control the handoff (if required) as a mobile station moves between local coverage areas 102-108 within the local wireless network 100.

The LAC 118 might then be coupled with a local radio tower 120 for linking the local wireless network with a public cellular wireless network 150 (such as Sprint PCS wireless network). As an example of the link, the radio tower 120 may be configured to communicate with a base transceiver station (BTS) 122 antenna of the cellular wireless network 150.

Each BTS 122 might connect to a base station controller (BSC) 124. The BSC 124 can function to control communications via one or more BTS 122. For instance, in some arrangements, a BSC 124 might control the power level of wireless signals emitted by a BTS 122 and might control the handoff of communications as a mobile station moves between sectors of the cellular wireless network 150.

The BSC 124 might then be coupled to a telecommunications switch or gateway, such as a mobile switching center (MSC) 126 and/or a packet data serving node (PDSN) 128, for instance. The MSC 126 might be coupled to one or more networks, such as the public switched telephone network (PSTN) 130, and manage voice sessions established by the mobile station. The PDSN 128 might be coupled to one or more data networks, such as a packet data network 132, and manage packet data sessions established by the mobile station.

When a user positions a mobile station within a local coverage area 102-108, the mobile station may communicate via an RF air interface with an antenna 110-116 and, in turn, via LAC 118 and radio tower 100 of the cellular wireless network 150. For example, a mobile station operating within the first local coverage area 108 may communicate with the first antenna 116. Consequently, a communication path can be established between the mobile station and the cellular wireless network 150 via a first air interface (between the mobile station and the first antenna 116), the LAC 118, the radio tower 120, and the BTS 122, for example.

According to an exemplary operation of an embodiment, a subset (one or more) of the antennas 110-116 receives a signal from a mobile station that is located within the local wireless network 100. For example, signals transmitted from a mobile station located within the first local coverage area 108 may be received by both the first antenna 116 and a second antenna 114. Thus, in this case, the subset of antennas would be the first and second antennas 114-116. The signal received by each antenna of the subset 114-116 is delivered to the LAC 118 for processing. In a further embodiment, a subset of antennas includes all the antennas on a floor or within a building.

In order to determine the location of the mobile station, the LAC 118 determines the strength of a signal between the mobile station and each antenna. After comparing the signal strengths between the mobile station and each antenna, the LAC determines that a given antenna received the strongest signal. Therefore, the LAC 118 determines that the mobile station is located within the local coverage area associated with the given antenna. An indication of the associated local coverage area is thus established as a representation of the location of the mobile station.

In the exemplary embodiment, the indication is then sent from the LAC 118 to the radio tower 120 and, in turn, into the cellular network 150, as a report of the location of the mobile station.

It should be understood that this and other arrangements described herein are set forth for purposes of example only, and other arrangements and elements can be used instead and some elements may be omitted altogether. Further, many of the elements described herein are functional entities that may be implemented as hardware, firmware or software, and as discrete components and/or in conjunction with other components, in any suitable combination and location.

2. Exemplary Architecture a) Wireless System Architecture

Figure 2A:
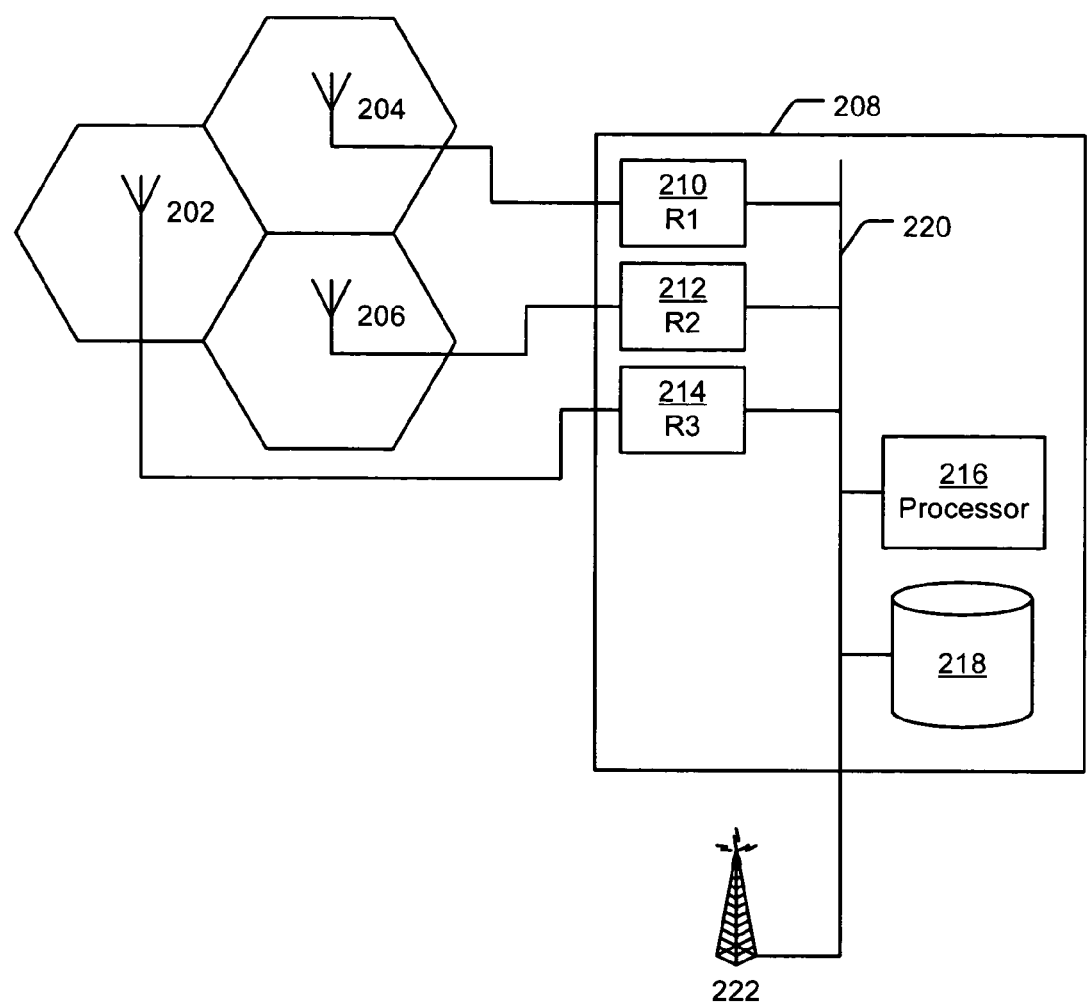
FIG. 2(a) is a block diagram illustrating components of an embodiment of a local antenna controller.

An exemplary embodiment of a local wireless network is shown in FIG. 2(a). Each of a plurality of antennas 202-206 is configured for wireless communication with at least one mobile station within its respective coverage area (shown as hexagons surrounding the antennas). The coverage areas need not be hexagonal in shape and, for instance, may be separate areas within an office building, a multi-floor housing development, a university, or a corporate campus, for example. Further, the coverage areas may overlap each other to some extent and may be contiguous or noncontiguous. Other coverage areas are possible as well.

A local antenna controller (LAC) 208 is coupled with the antennas 202-206. A plurality of repeaters 210-214 are arranged as part of the LAC 208. Each repeater 210-214 is associated with one of the antennas 202-206. Thus, a first repeater 210 is communicatively coupled with a first antenna 202; a second repeater 212 is communicatively coupled with a second antenna 204; and a third repeater 214 is communicatively coupled with a third antenna 206.

Although a plurality of repeaters 210-214 are shown in FIG. 2(a), an alternative embodiment provides that a single repeater is configured within the LAC 208. In that case, the single repeater would include functionality for communicating with the plurality of antennas 202-206. Such functionality may include, for example, a switch or a multi-signal processing subunit. Additionally, the single repeater may separate signals received from the various antennas 202-206. More generally, the repeaters 210-214 may be hardware/software combinations, and thus may be devices other than traditional repeaters.

The couplings between the antennas 202-206 and the repeaters 210-214 are preferably high-speed, low-loss cable such as, for example, co-axial or fiber optic cable. Other connections may be used, such as a broadband connection through a packet switched network and/or a WiFi 802.11 connection.

A bus 220 within the LAC 208 interconnects the repeaters 210-214 with other elements of the LAC 208. Data storage 218, for storing executable instructions and for storing antenna location data, is coupled with the bus 220. Additionally, a processor (or multiple processors) 216 is coupled with the bus 220 and is useful for executing machine language instructions stored in data storage 218.

The LAC 208 is also coupled with an external antenna 222 for communicating between the local wireless network and an external cellular wireless network. The construction of the external antenna 222 may depend upon the type of the external cellular wireless network. Although the external antenna 222 may be located outside of a building, its name simply indicates that the external antenna 222 communicates with an external network.

According to one embodiment, a 7 dB Uda-Yagi Directional Antenna (also known as a "beam" antenna) may be used to communicate between the local wireless network and the external cellular wireless network. A directional antenna is useful for providing a strong low-power connection in a specific direction. This type of antenna will be useful if a specific BTS antenna provides access to the external cellular wireless network. This scenario is more likely if the local wireless network is configured to communicate with a single external cellular wireless network (such as Sprint's PCS network) and a BTS of the external cellular wireless network is in a known, fixed position.

However, the local wireless network may be configured to communicate with multiple external cellular wireless networks. In that case, the external antenna 222 may be configured to be, for example, an omnidirectional antenna. Alternatively, a plurality of external antennas could be provided—each configured for communication with a separate external cellular wireless network 222. In an alternative embodiment, the LAC is coupled with the external cellular wireless network through a packet network, such as an IP network or LAN. In this alternative embodiment, a packet data network may interconnect the LAC with a cellular tower or a public switched telephone network, for example.

Figure 2B:
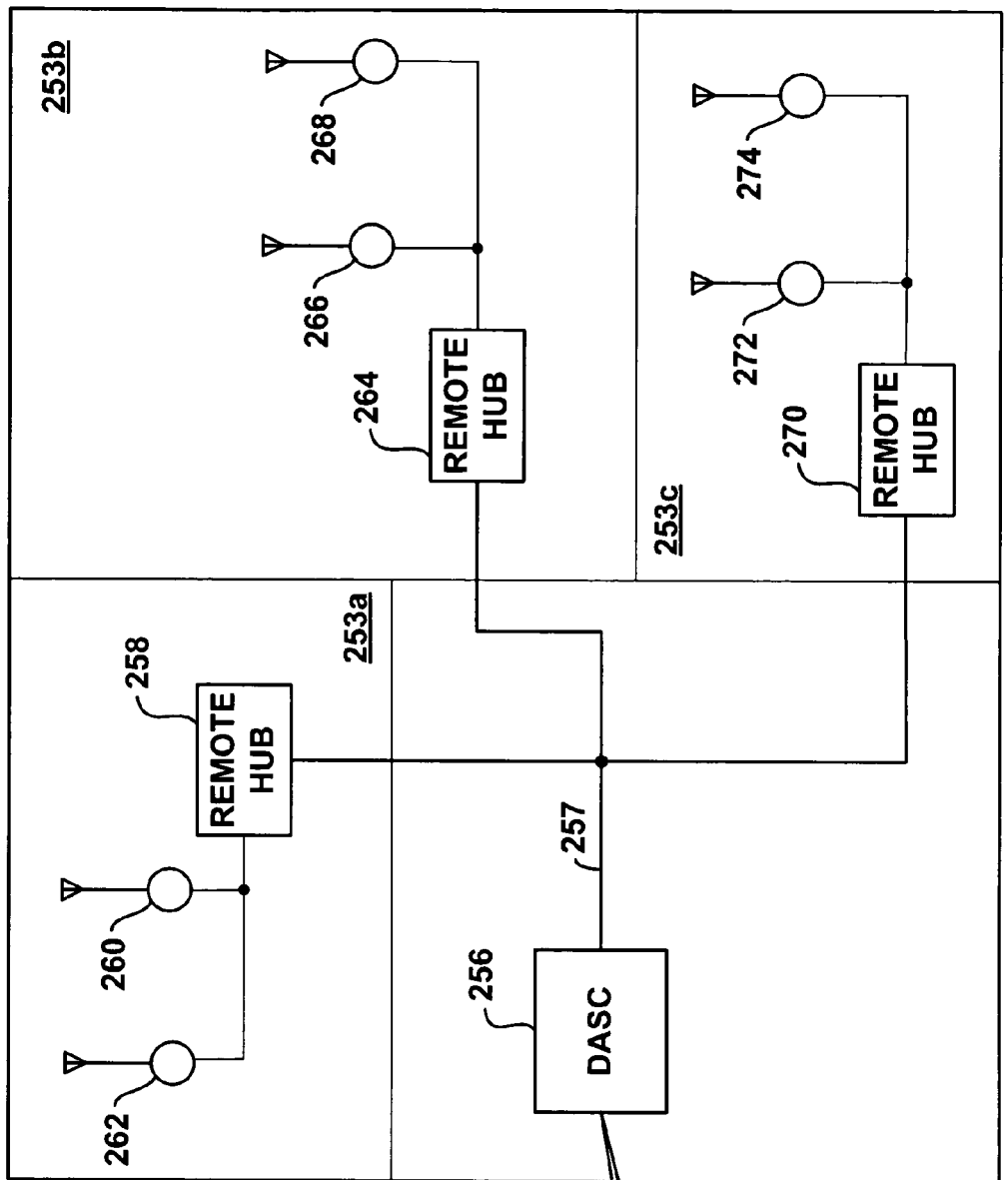
FIG. 2(b) is a block diagram showing an embodiment of a distributed antenna system (DAS).

FIG. 2(b) illustrates one example of a local wireless network arranged as a distributed antenna system (DAS) 250. The DAS 250 shown in FIG. 2(b) comprises, by way of example, an in-building antenna system. The antenna system shown spans three rooms 253a-c on a single floor, however the antenna system may extend through more or fewer rooms and/or floors. Also, it should be understood that the DAS 250 may also be particularly useful in an area that a wireless network does not reach, such as an RF blocked area (not limited to a building).

As shown in FIG. 2(b) DAS 250 is coupled with a BTS 252 (of a wireless network) via a DAS controller (DASC) 256 via link 254. In the embodiment, the BTS 252 is arranged to receive communications signals and pass them on to the antenna system via link 254. The link 254 may be a wireless interface as shown in FIG. 2(a). Alternatively or additionally, the link 254 may be a wired transmission line.

The DASC 256 may convert signals received from the BTS 252 into optical signals, for instance, and distribute the optical signals via fiber optic cables 257 to remote hubs 258, 264, and 270. Alternatively, infrared laser cables, wireless RF interconnects, coaxial cables, or category 5 twisted pair cables may be used instead of, or in addition to fiber optic cables 257. Indeed, those of skill in the art will recognize that any suitable type of signal transmission media may be used.

The DASC 256 may be in any location within the antenna system, such as a central location, or within a basement of a building. Similarly, the remote hubs 258, 264, and 270 may be positioned in any location in the building. However, it may be desirable to position them near the antennas they control.

Each remote hub (258, 264, and 270) controls signal transmission between the DASC 256 and one or more antennas. To do so, the remote hubs 258, 264, and 270 are coupled to their respective group of antennas through fiber optic cables (or other suitable connections). For example, remote hub 258 couples to antennas 260, 262, remote hub 264 couples to antennas 266, 268, and remote hub 270 couples to antennas 222, 224. Each remote hub receives the signals from the DASC 256 and distributes them to their respective antennas. The antennas then receive the signals and convert them back to RF signals (if necessary) for wireless transmission in the building.

The antennas 260, 262, 266, 268, 222, and 224 may take any suitable form. Including indoor antennas, such as cable antennas, which may provide wireless services over a small distance, or panel antennas, which are small antennas designed to minimize visibility. Alternatively, the antennas 206, 262, 266, 268 may be typical outdoor antennas mounted on the roof of the building, for example. Other alternatives include an omni antenna or a directional antenna.

Additionally, the DAS 250 may comprise other elements positioned throughout the antenna system and interconnected through wired links (e.g., fiber optic cables) or wireless links. For example, additional hubs or other routers may be interconnected within a group of antennas to route signals. In addition, the DAS 250 may include wireless repeaters or other transmission and reception equipment to further transmit and receive wireless signals via the antenna system.

b) Antenna Radiation Patterns

Figure 3:
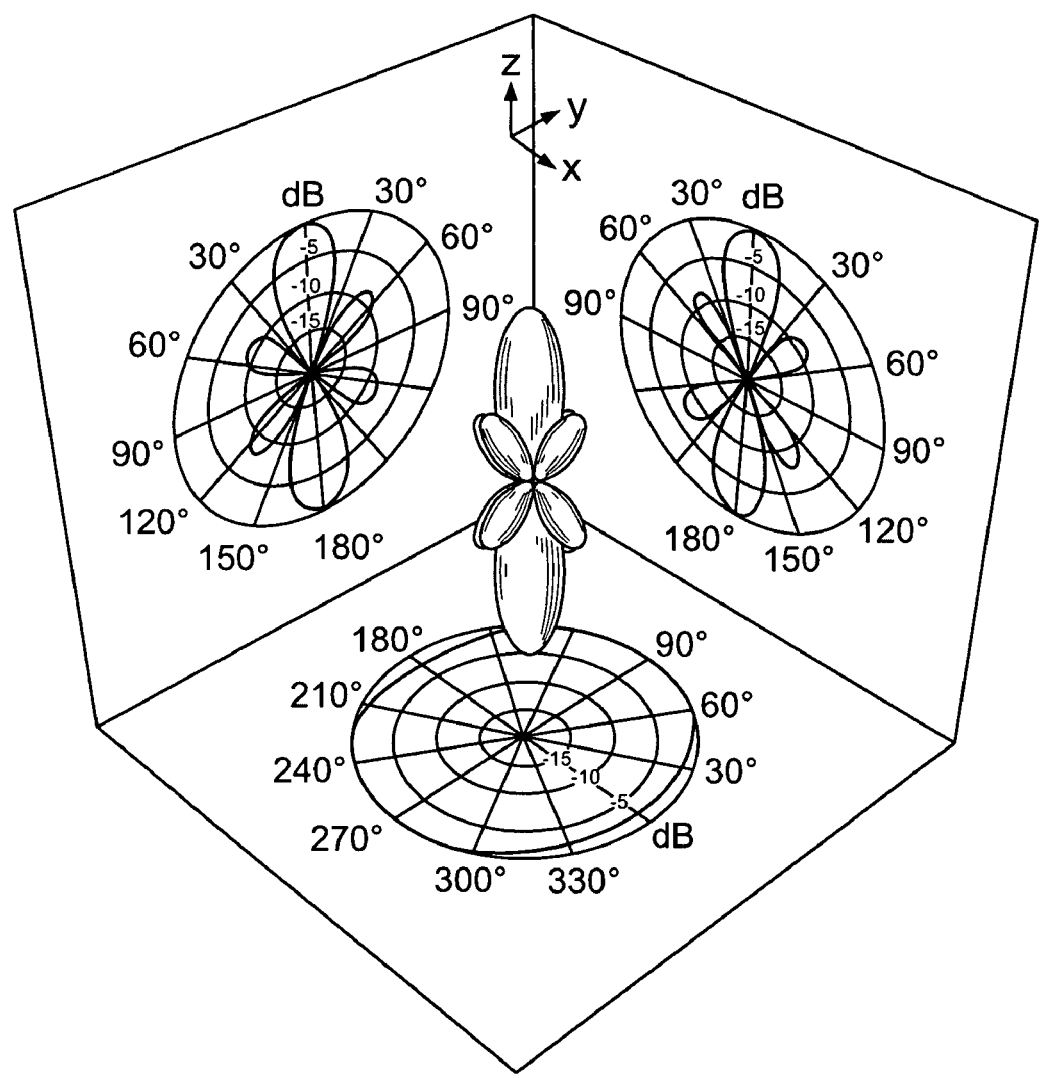
FIG. 3 provides a three-dimensional view of a radiation pattern of an embodiment of an antenna for use in a DAS.

FIG. 3 provides a three dimensional radiation pattern of an exemplary antenna, such as antenna 260 of FIG. 2(*b*). Two-dimensional radiation patterns are also shown in each plane. As shown in FIG. 3, an RF radiation pattern extends primarily along the z-axis in two large lobes. Minor lobes are also shown extending in other directions. Such a radiation pattern is consistent with that of a bi-dimensional antenna.

The bi-directional antenna (also known as a dipole antenna) can be oriented in any direction according to floor plan requirements. For example, an antenna having local coverage area that is intended to include areas on a floor of a building may be oriented so that the z-axis of the antenna (as shown in FIG. 3) runs parallel with the floor. On the other hand, an antenna serving an elevator shaft, for example, may be oriented so that the z-axis runs up and down the shaft in order to maximize coverage within the shaft.

Figure 4:
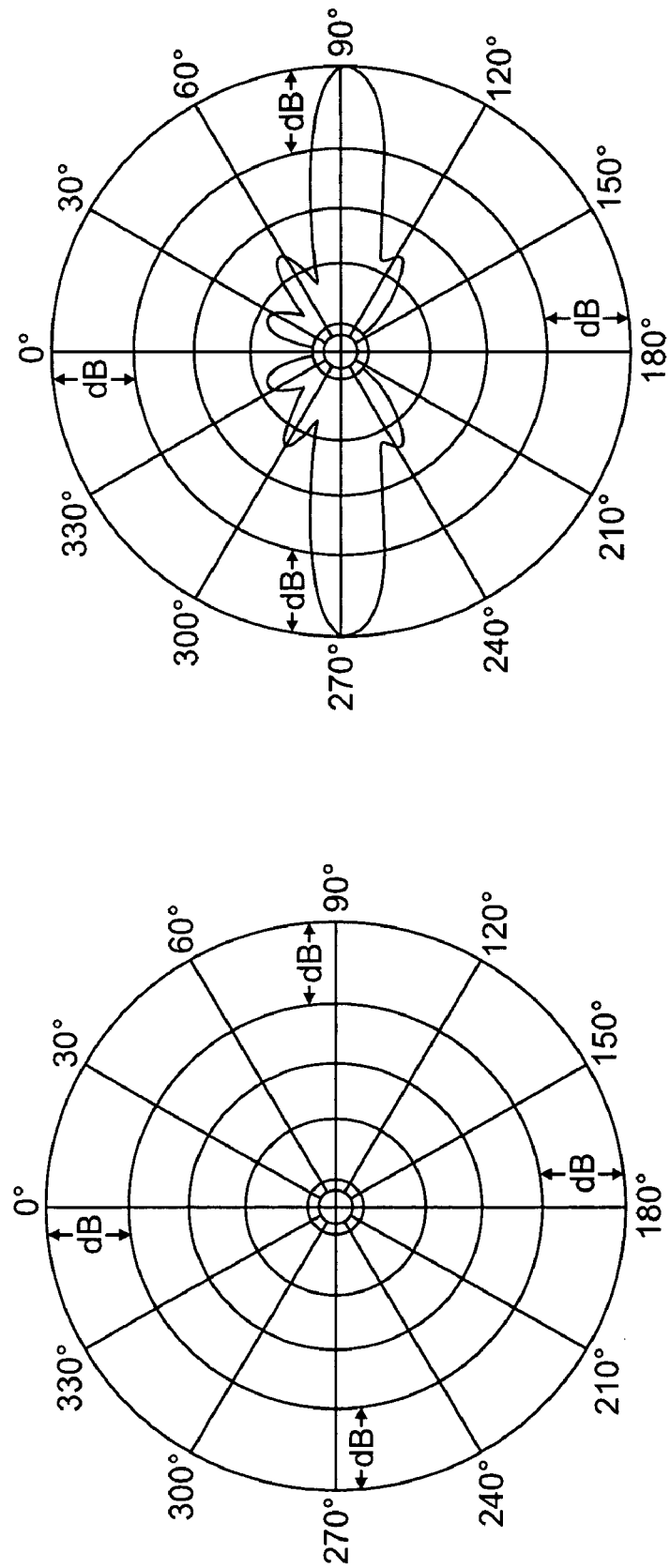
FIG. 4 provides a pair of radiation pattern charts for an embodiment of a planar omnidirectional antenna for use in a DAS.

Other types of antennas may also be used to provide coverage within the local wireless network. For example, a planar omnidirectional antenna may be useful for providing more complete coverage for a floor of a square or round area. FIG. 4 illustrates a radiation diagram for such a planar omnidirectional antenna that may be used in accordance with an embodiment. In both the horizontal pattern (H-plane) diagram and vertical pattern (E-plane) diagram, a shaded area represents a local coverage area of the planar omnidirectional antenna centered at the origin of each polar graph. As shown, the H-plane radiation pattern is evenly distributed within the plane and therefore, may be desirable for covering a circular floor plan, for instance. In contrast, the E-plane, radiation pattern does not extend far from the horizontal plane. Thus, in a multi-floor building, an antenna with this radiation pattern may provide coverage only on one floor.

Figure 5:
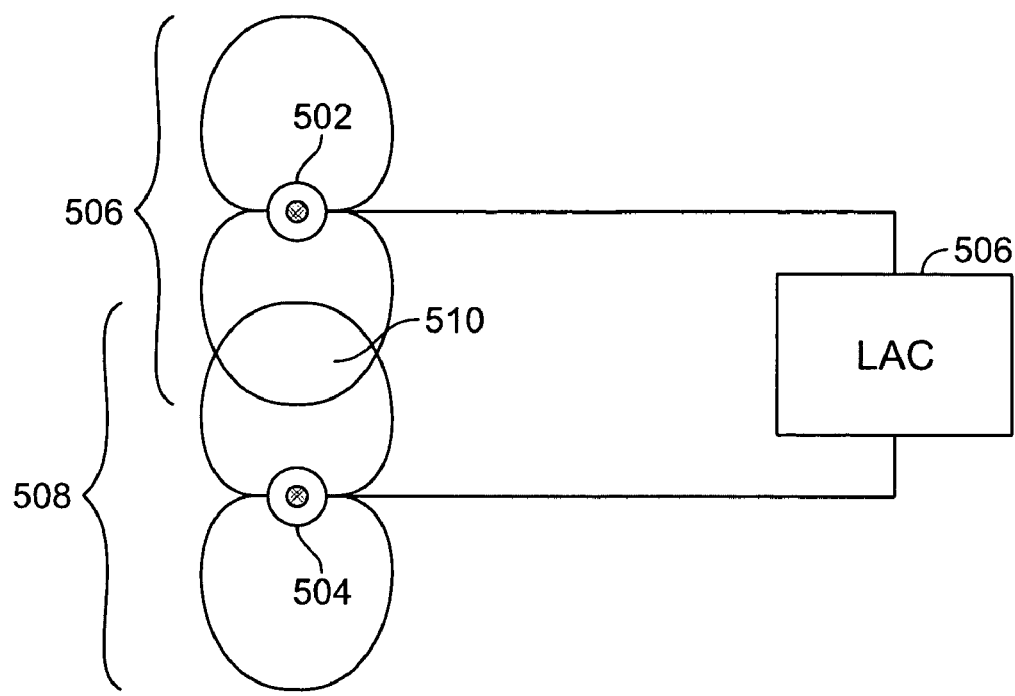
FIG. 5 is a block diagram showing radiation patterns of two antennas in a DAS.

Because of the irregular and lobular shapes of the radiation patterns of many antennas, radiation patterns may overlap. In one embodiment, the radiation patterns of the antennas substantially overlap to ensure adequate system coverage. The overlapping radiation patterns of two bi-directional antennas are shown in FIG. 5. As shown, two antennas, 502, 503 are coupled with a LAC 506. The radiation patterns of the antennas 502, 504 are shown as double lobed patterns 506, 508. The double lobed radiation patterns 506, 508 of the antenna 502, 504 overlap at 510.

Thus, it may be likely that at any given point within a building equipped with a DAS, a mobile station may be within radiation fields of multiple DAS antennas. Additionally, although the radiation fields in FIG. 5 are shown as discrete patterns, the true nature of the coverage area involves a gradual decline in signal strength from an antenna as the distance from the antenna increases. The fields shown in FIGS. 3-5 simply represent some threshold field where a certain quality of communication is supportable.

According to the exemplary embodiment, a given antenna provides bi-directional amplification of the wireless signal. For example, a 5 dB gain bi-directional amplifier for each antenna can be used to ensure proper signal strength. Each bi-directional antenna may be configured to serve a floor area of approximately 25 feet by 10 feet.

c) Organization of a Distributed Antenna System

Figure 6:
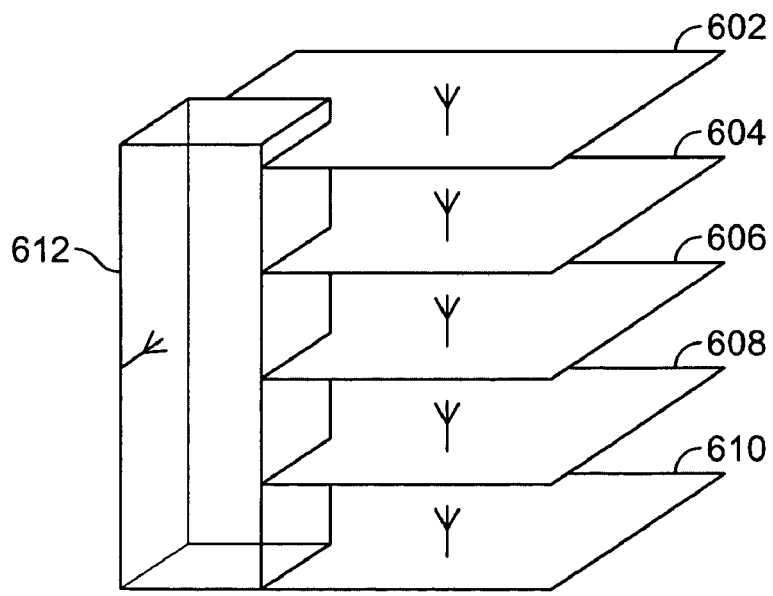
FIG. 6 shows an embodiment of a multi-floor building with a DAS.

FIG. 6 shows an embodiment of a simplified distributed antenna system (DAS) in a multi-floor building. Five floors are shown (602-610). Each floor (602-610) has an associated antenna for use in the DAS. Alternatively, multiple antennas may be associated with each floor. An elevator shaft 612 is also shown extending past each floor (602-610). The elevator shaft 612 also has an associated antenna for use in the DAS.

According to one embodiment, all the antennas on a first floor 610 are served by a single remote hub. Alternatively, multiple remote hubs are used to serve the antennas on the first floor. According to another embodiment a single remote hub is used to serve antennas located on multiple floors. For example a single remote hub may be configured to serve the antennas on both the first floor 610 and a second floor 608.

According to an exemplary embodiment, a single local antenna controller (or DASC) is capable of managing all of the antennas within the building. Thus, a single DASC for managing all of the building's antennas may be placed on one of the floors 602-610 or elsewhere in the building.

Figure 7:
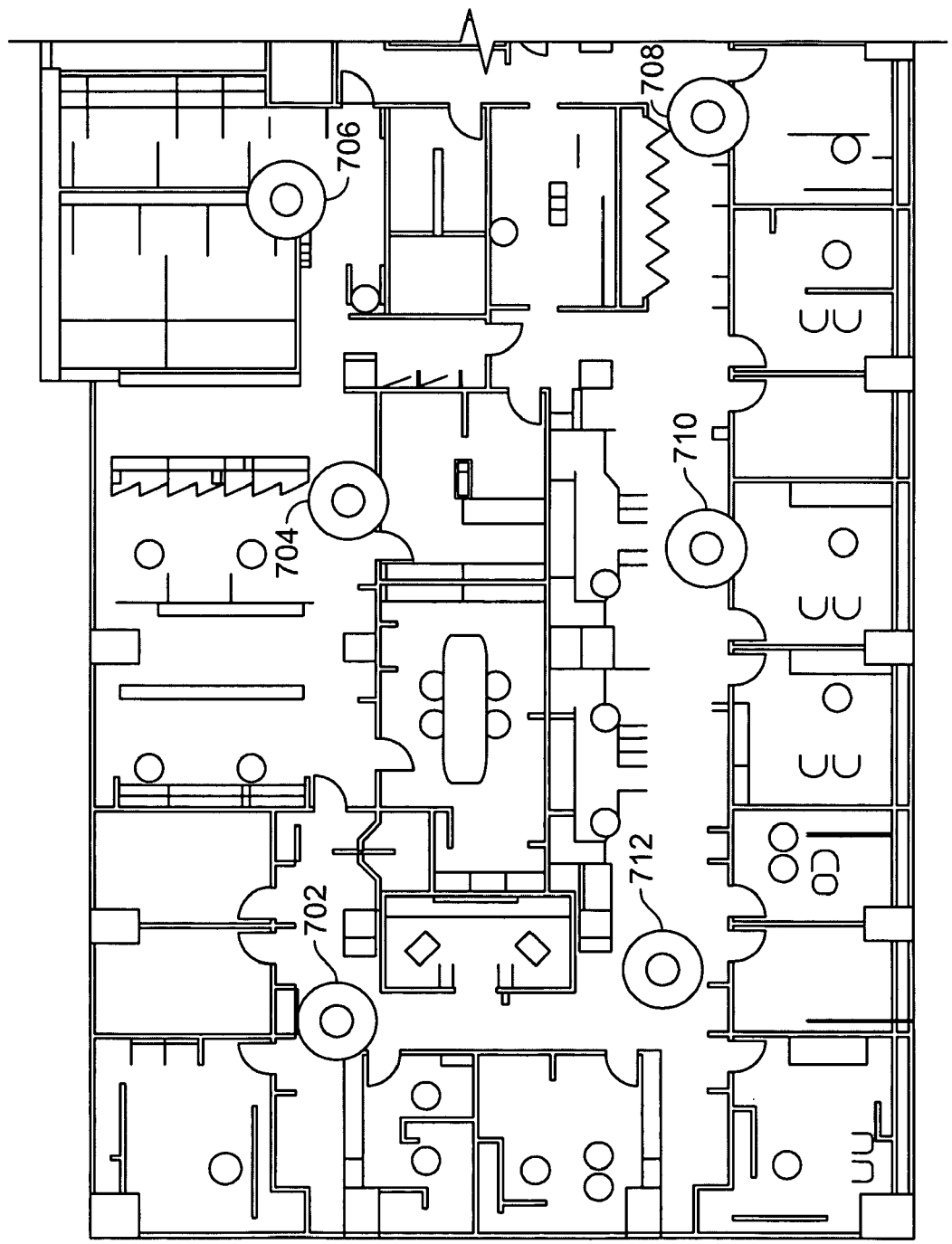
FIG. 7 shows a floor plan of an embodiment of a building with a DAS.

FIG. 7 shows a portion of a single floor with a DAS. The floor plan could represent that of an office building or a condominium, for instance. A set of antennas 702-712 is part of the DAS and provide wireless communications functionality for mobile stations being used within the building.

d) Local Antenna Controller

Figure 8:
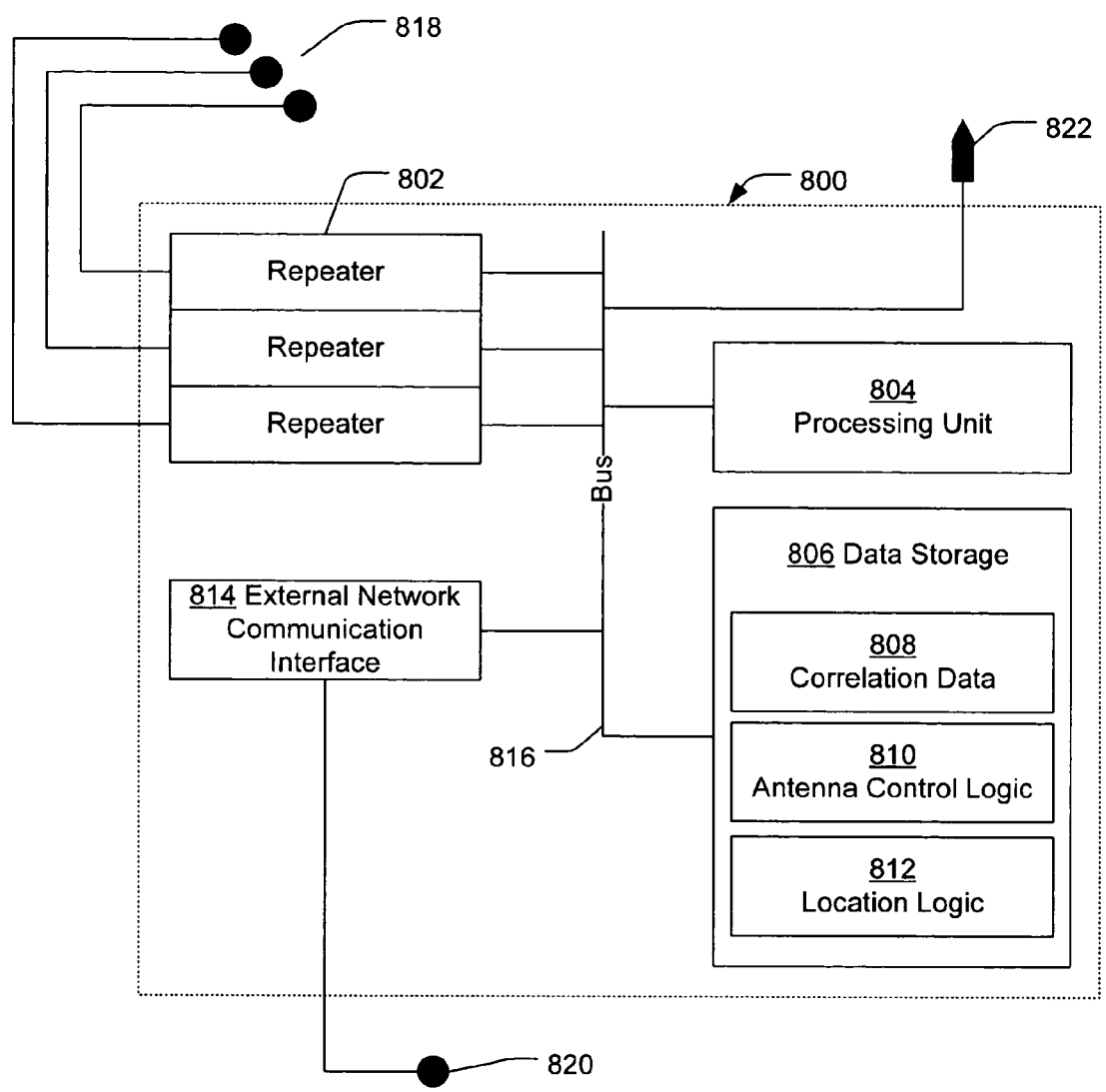
FIG. 8 is a block diagram of an embodiment of a local antenna controller.

A block diagram of a local antenna controller (LAC) is shown in FIG. 8. A LAC 800 may be a self-contained device or may be several devices coupled together through communication connections for controlling a distributed antenna system. According to an embodiment, the LAC 800 is a DASC.

Repeaters 802 for communicating with local antennas 818 are included within the LAC 800. The repeaters 802 are also coupled with a data bus 816. According to the embodiment, the data bus 816 is then coupled with a processing unit 804, data storage 806, an external network communication interface 814, and a serial datalink 822. Data storage 806 may include correlation data 808, antenna control logic 810, and location logic 812, for example. An external network node 820 is also shown coupled with the external network communication interface 814.

Local antennas 818 each have a fixed (or designated) local coverage area. Additionally, each of the local antennas 818 is coupled with one of the repeaters 802. Typically, a repeater may consist of a radio transceiver tuned to an "input frequency", and a separate radio transceiver tuned to an "output frequency". Additionally, in some jurisdictions, the law may require a repeater to have an automatic identifier. Other configurations of repeaters are known to those skilled in the art and may also be incorporated into the embodiments.

The data bus 816 provides a means of communication between the various elements of the LAC 800. One skilled in the art will recognize that other means of enabling communication between elements are available, such as a ring-loop, or a processor-centric design.

A processing unit 804 is generally configured to read and execute machine readable instructions and may be a microprocessor or digital signal processor. Machine readable instructions are stored in data storage 806 or provided through a serial datalink 822, for example. Data storage 806 may include a combination of both shorter term memory devices and longer term data storage devices.

Correlation-data 808 defines a plurality of geographic areas and, for each geographic area, a corresponding antenna within the DAS, as shown in Table 1.

TABLE 1

| Antenna | Location Name |
|---|---|
| xxx.xxx.xxx.xxx | Building A, 4$^{th}$ Floor, North Side |
| yxx.xxx.xxx.xxx | Building B, Basement |
| zxx.xxx.xxx.xxx | Building B, 34$^{th}$ Floor, Near the South Elevator Bank |

Table 1 shows correlation-data 808 stored in a two-column table. A first column ("Antenna") contains an antenna name or identification number. The network address, for example, could be a locally unique identifier of the antenna. A second column ("Location Name") contains corresponding geographic location name information for each antenna.

In another embodiment, an indicator of a geometric area within a map is stored in correlation-data 808. In a further embodiment, antenna location is represented by a series of vertices that define a polygonal area on a floor plan of a building. In yet another embodiment, a list of rooms associated with each antenna is stored in correlation-data 808. Other columns are possible. The representation of the geographic coverage area may vary from the actual coverage area of the antenna. This difference may be the result of a simplification of the area or a bias shift of the area.

Further, the representation of the geographic coverage areas may be granulized so that the representation may include entire rooms despite the fact that the actual coverage area does not cover the entire area occupied by the rooms. These modifications may, for example, make it easier for a user to physically find a mobile station operating within the DAS.

Additionally, or alternatively, correlation-data 808 may contain mobile station location information that correlates a mobile station with its antenna location, as shown in Table 2.

TABLE 2

| Mobile Station | Record Date | Antenna | Location Name |
|---|---|---|---|
| axx.xxx.xxxx | Mar. 10, 2004 5:34 pm | xxx.xxx.xxx.xxx | Building A, 4$^{th}$ Floor, North Side |
| bxx.xxx.xxxx | Mar. 10, 2004 5:03 pm | yxx.xxx.xxx.xxx | Building A, 4$^{th}$ Floor, North Side |
| cxx.xxx.xxxx | Mar. 9, 2004 12:03 am | zxx.xxx.xxx.xxx | Building B, 34$^{th}$ Floor, Near the South Elevator Bank |

As shown, Table 2 has a first column ("Mobile Station") containing mobile station identification information. A second column ("Record Date") contains, for example, a date-time stamp that indicates when the record was obtained. A third column ("Antenna") contains a unique identifier for the antenna. A fourth column ("Location Name") contains antenna location information. Various embodiments have fewer or more columns. Additionally, the data may be separated into multiple tables. However, a relevant feature of Table 2 is that a mobile station is correlated with a specific DAS antenna, and therefore with its coverage area.

According to a further embodiment, the LAC records location history of a mobile station as correlation-data 808. In this embodiment, a series of records are stored that correlate the mobile station with a specific antenna at a specific time.

The antenna control logic 810 is, according to an embodiment, a set of machine language instructions that is executable by the processing unit 804 (or possibly the repeaters 802) for controlling the DAS. For example, the antenna control logic 810 may contain instructions for managing session signaling, channel allocation, and connections. One skilled in the art will recognize the functions necessary for controlling the DAS and their embodiment as antenna control logic 810.

According to an exemplary embodiment, location logic 812 is a set of machine language instructions executable by the processing unit 804 or the repeaters 802, and may, for instance, be a collection of compiled executable programs. Additionally, the location logic 812 may be useful for instructing the processing unit 804 for 1) determining location information for a mobile station operating within the DAS; 2) storing location information within the correlation data 808; 3) providing location information of the mobile station to a third device such as another mobile station on a foreign network; 4) updating location information; and, more specifically, requesting a location signal from a mobile station operating within the DAS; 5) calculating signal strength of a signal received at each of a plurality of DAS antennas; 6) determining which DAS antenna received the strongest signal from the mobile station operating within the DAS; 7) retrieving location information from the correlation data 808; and 8) providing a map pointing out location, for instance. One skilled in the art will understand that this list is not an exhaustive list of functionality.

The LAC 800 can be programmed (or data can be updated) via the serial datalink 822 at the LAC which connects to a computer, for instance. Alternatively, the LAC 800 may also include manual data entry functionality through a user I/O (not shown). Further, the LAC 800 may be programmed through a wireless link.

The LAC 800 may also be configured to communicate with the external network node 820 using any of a variety of different protocols. For instance, in a TDMA system, the node 820 communicates on a group of frequencies, and each frequency may itself carry at least one multiplexed call or data session. In a CDMA system, by comparison, the node 820 communicates over a spread spectrum of frequencies, and the spectrum may carry many multiplexed calls and/or data sessions. Typical components for CDMA systems include those described in the CDMA2000 standard, 3GPP2 C.S0001-C, dated May 28, 2002, which is incorporated herein by reference in its entirety. The Global System for Mobile Communications (GSM) or other methods may also be used.

According to another embodiment, each local antenna has an associated receiver module for measuring the strength of the received signal.

3. Exemplary Operation

The aforementioned system operates to provide a communication link between a mobile station operating within a local wireless network and a device on an external cellular wireless network. In one embodiment, a local antenna controller (LAC) determines an indication of the location of the mobile station within the local wireless network and delivers the indication to the external cellular wireless network.

Figure 9:
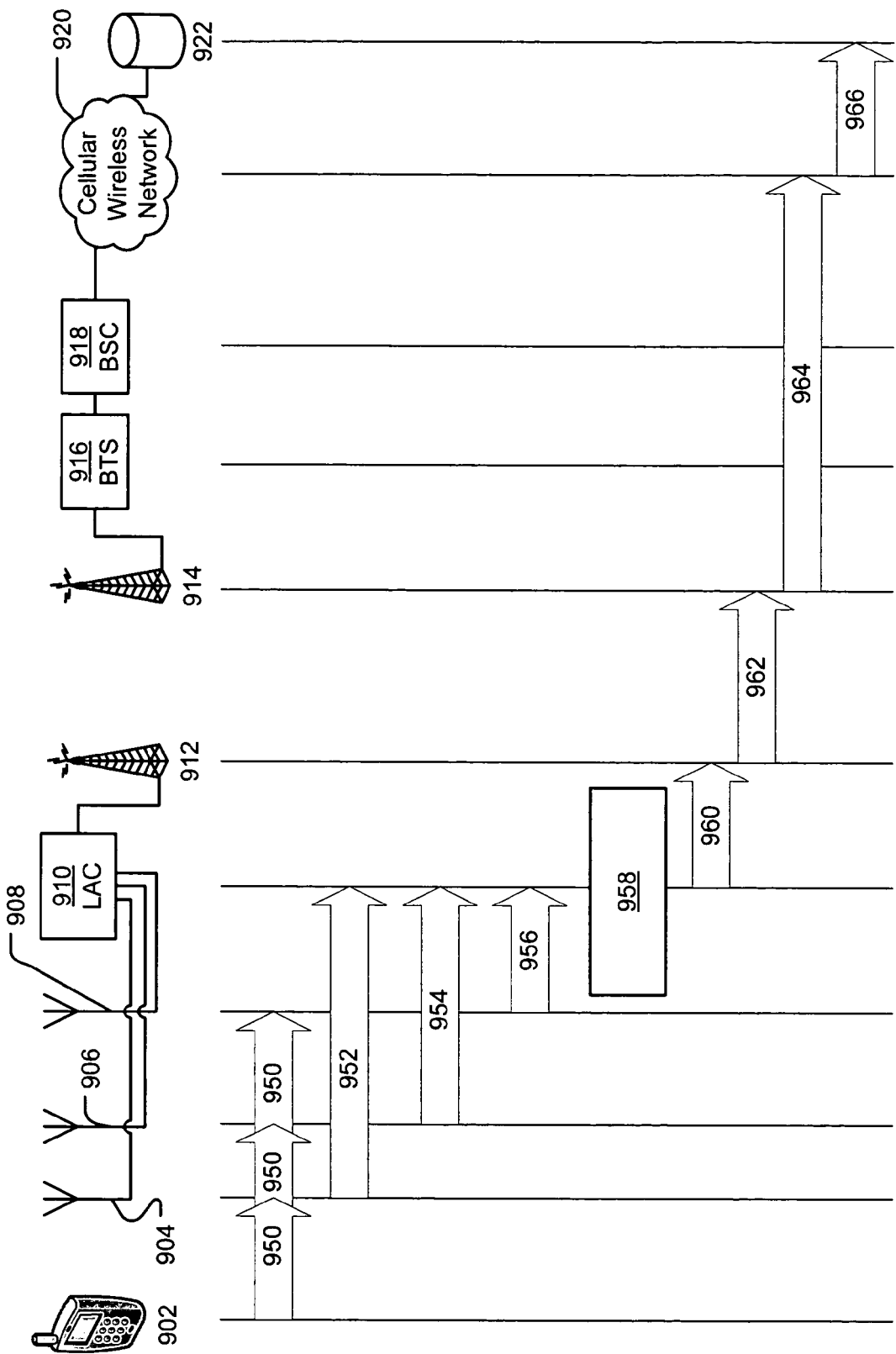
FIG. 9 is an exemplary messaging diagram showing a mobile station location process and communication between a DAS and a cellular wireless network.

FIG. 9 provides a message flow diagram showing exemplary operation of the mobile station location function. As show in FIG. 9, a local mobile station 902 is located within a local wireless network that is served by a plurality of local antennas. Three local antennas are shown as a first local antenna 904, a second local antenna 906, and a third local antenna 908. Each local antenna is communicatively coupled with a LAC 910. The coupling may, for example, be direct or may pass through one or more remote hubs or other local network. The LAC 910 has an external antenna 912 for communicating with an external cellular wireless network. Specifically, the external antenna 912 is configured to communicate with a BTS antenna 914 that is coupled with a BTS 916. The BTS 916 is controlled by a BSC 918. Communications can pass between the BSC 918 and a cellular wireless network 920. Data storage 922 is coupled with the cellular wireless network 920 and provides functionality for storing messages and other data.

According to an exemplary operation for providing mobile station location information, the mobile station 902 broadcasts a message within the local wireless network that is received by each of the three local antennas 904-908 at step 950. Upon receiving the message, the first, second, and third antennas 904-908 each forward the message to the LAC 910 at steps 952, 954, and 956 respectively.

The LAC 910 then determines an indication of the location of the mobile station 902 at step 958. According to an embodiment, the LAC 910 processes messages 952-956 to determine which local antenna provided the message with the strongest signal. Once it is determined which local antenna provided the strongest signal, the LAC 910 searches its database to determine the local coverage area of the given local antenna, still at step 958. (More generally, the LAC 910 obtains an indication of the local coverage area of the given antenna.)

The indication of the local coverage area of the given local antenna (with the strongest signal) is provided to the external antenna 912 as a representation of the location of the mobile station 902 at step 960. The external antenna then sends the indication as an RF signal to the BTS antenna 914 at step 962. Following a standard cellular pathway, for instance, at step 964, the indication is sent from the BTS antenna 914 to the cellular wireless network 920. The message is finally stored at data storage 922 for future reference.

Figure 10:
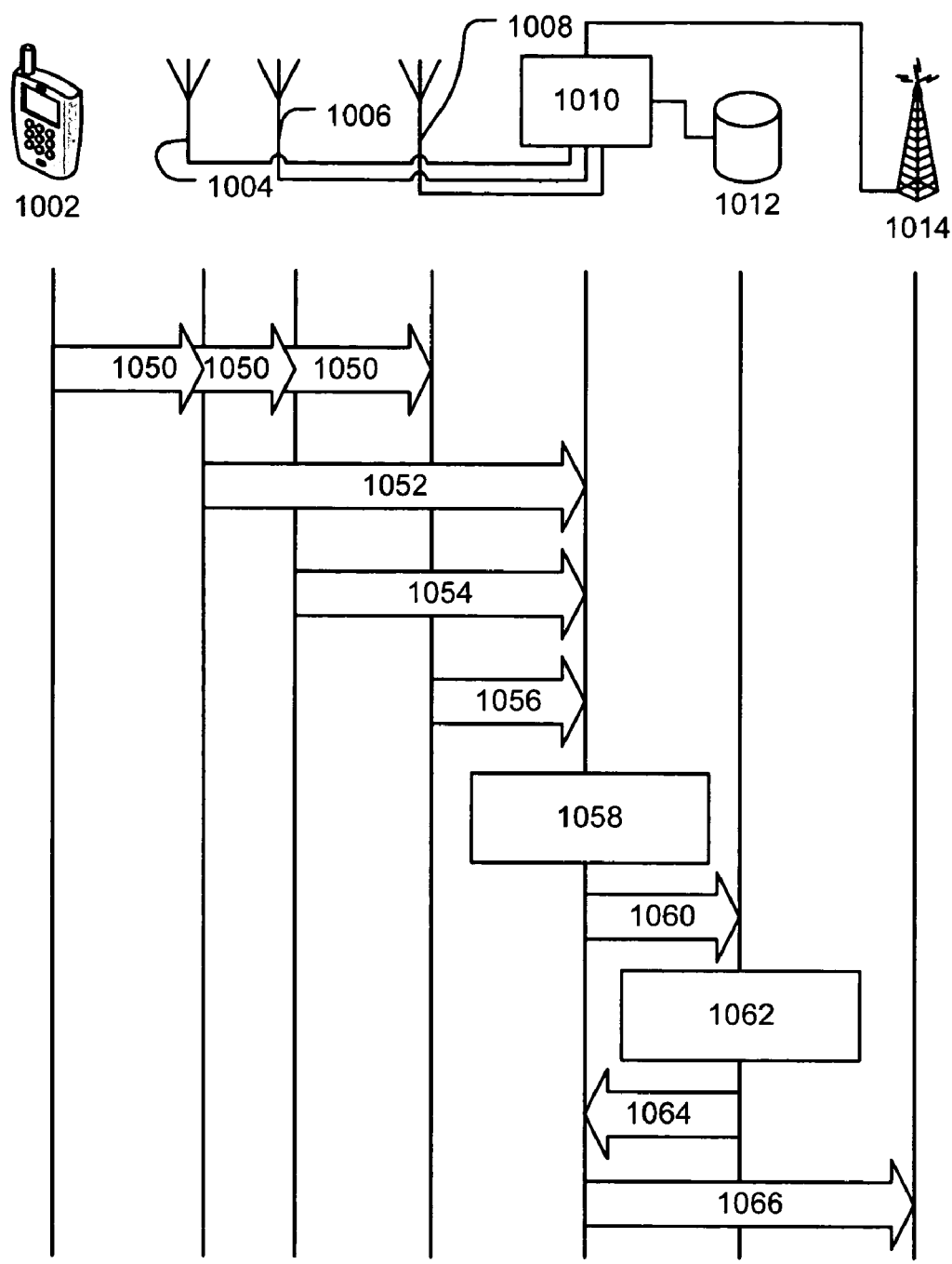
FIG. 10 is an exemplary messaging diagram showing a mobile station location process and a combined location retrieval process.

FIG. 10 provides a messaging flow diagram for another embodiment for obtaining mobile station location information. A mobile station 1002 is located within a distributed antenna system (DAS) that is served by a plurality of DAS antennas 1004-1008. Each DAS antenna is communicatively coupled with a DAS controller (or LAC) 1010. DAS data storage 1012 may be located within the DAS controller 1010 or may be otherwise communicatively coupled with the DAS controller 1010. The DAS controller 1010 is also coupled with an external antenna 1014 for communicating with a foreign radio network.

The mobile station 1002 is configured to communicate through the DAS. During one such communication, the mobile station broadcasts a signal 1050 that is received by the plurality of DAS antennas 1004-1008. Each DAS antennas 1004-1008 forwards the received message to the DAS controller 1010 at step 1052-1056. The DAS controller 1010 determines which of the messages 1052-1056 was received with the greatest strength.

According to one embodiment signal strength is determined by converting a radio-frequency version of the signal into a digital representation of the strength of the signal. Those skilled in the art will recognize that the signal strength may be calculated by a recorded signal strength indicator (RSSI). Other methods of determining the signal strength are available.

An identifier for the mobile station 1002 and an identifier for the antenna that delivered the message with greatest strength to the LAC 1010 are sent to data storage 1012 at step 1060. Then, at 1062, the data storage 1012 integrates the new location information into the correlation data stored on the data storage 1012. According to the embodiment, the correlation data contains information that associate the antenna identifier with location information.

Upon request, or for another reason, location information associated with the last known location of the mobile station 1002 is sent from data storage 1012 to the LAC 1010 at step 1064. The mobile station location information is then sent to the external antenna 1014 for delivery to a foreign radio network at step 1068.

Figure 11:
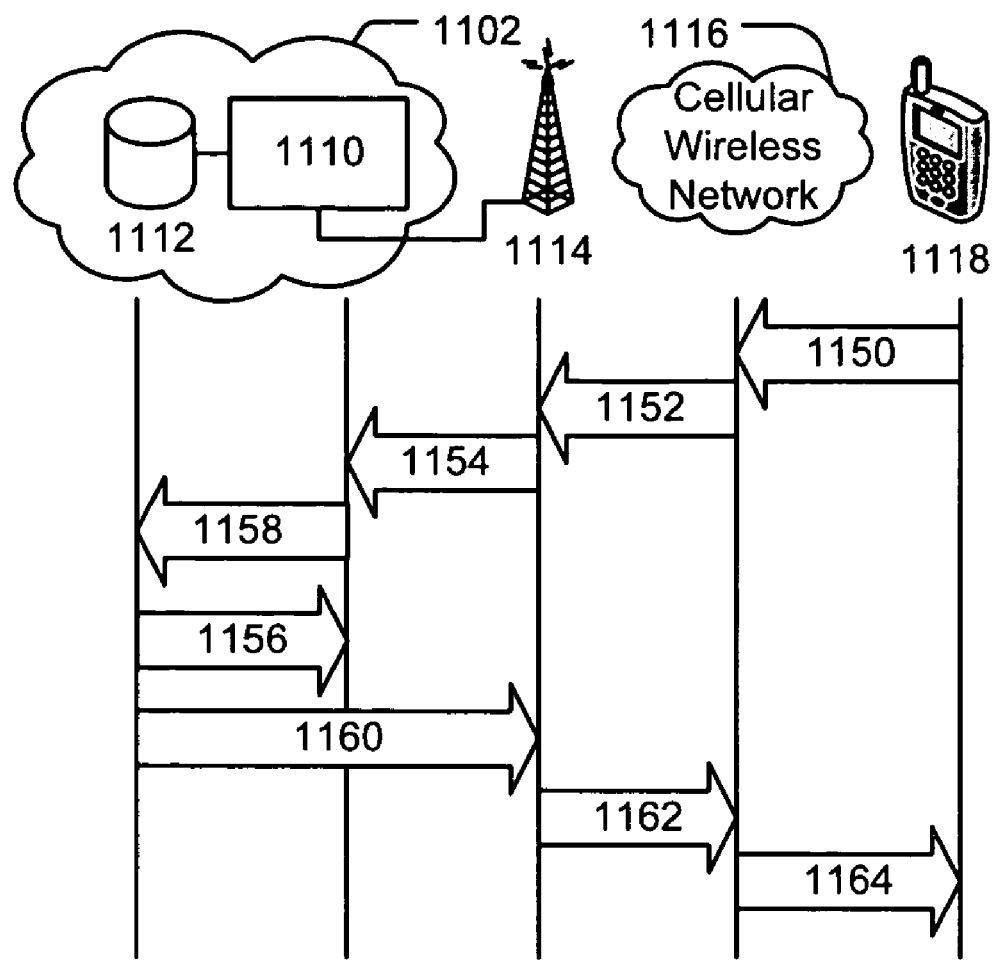
FIG. 11 is an exemplary messaging diagram showing a location retrieval process requested by a mobile station on a foreign network.

According to another embodiment, a communications device connected to a foreign network such as an external cellular wireless network hopes to learn the location of a mobile station operating in a DAS. FIG. 11 provides messaging sequence for an embodiment where the location of the mobile station has already been stored in data storage 1112 using of the above methods. The data storage 1112 and a DAS controller 1110 are both shown within a DAS 1102 that may be, for example, located within a building or at a campus of buildings.

An external antenna 1114 is coupled with the DAS 1102 and enables communication between the DAS 1102 and an external radio frequency network such as a cellular wireless network 1116. A communication device 1118 (such as a cell phone or wireless PDA) is shown in communication with the cellular wireless network 1116.

Initially, at step 1150, the communication device 1118 sends a request message into the cellular wireless network 1116 to request the location of the mobile station (not shown) operating within the DAS 1102. The cellular wireless network 1116 locates the DAS and delivers the request to the external antenna 1114 at step 1152. The request message is then forwarded from the external antenna 1114 to the DAS controller 1110 at step 1154.

The request message is either directed to the mobile station operating within the DAS 1102 or else directed to the DAS 1102 itself. The mobile station might not, however, have accurate information regarding its own location. Location information on the mobile station may be out-of-date, or may reflect the mobile station's location within the cellular wireless network 1116 rather than the mobile station's location within the DAS 1102, for instance. Thus, rather than forwarding the request message to the mobile station operating in the DAS 1102, the DAS controller 1110 acts on the request message by obtaining location information from data storage at steps 1156-1158. If the location information is available, the DAS controller 1110 sends a data message to the communication device 1118 that includes information regarding the mobile station's location within the DAS 1102 at steps 1160-1164.

According to this embodiment, the location of a mobile station operating in the DAS 1102 may be obtained by a user in a foreign network without directly contacting the mobile station.

Figure 12:
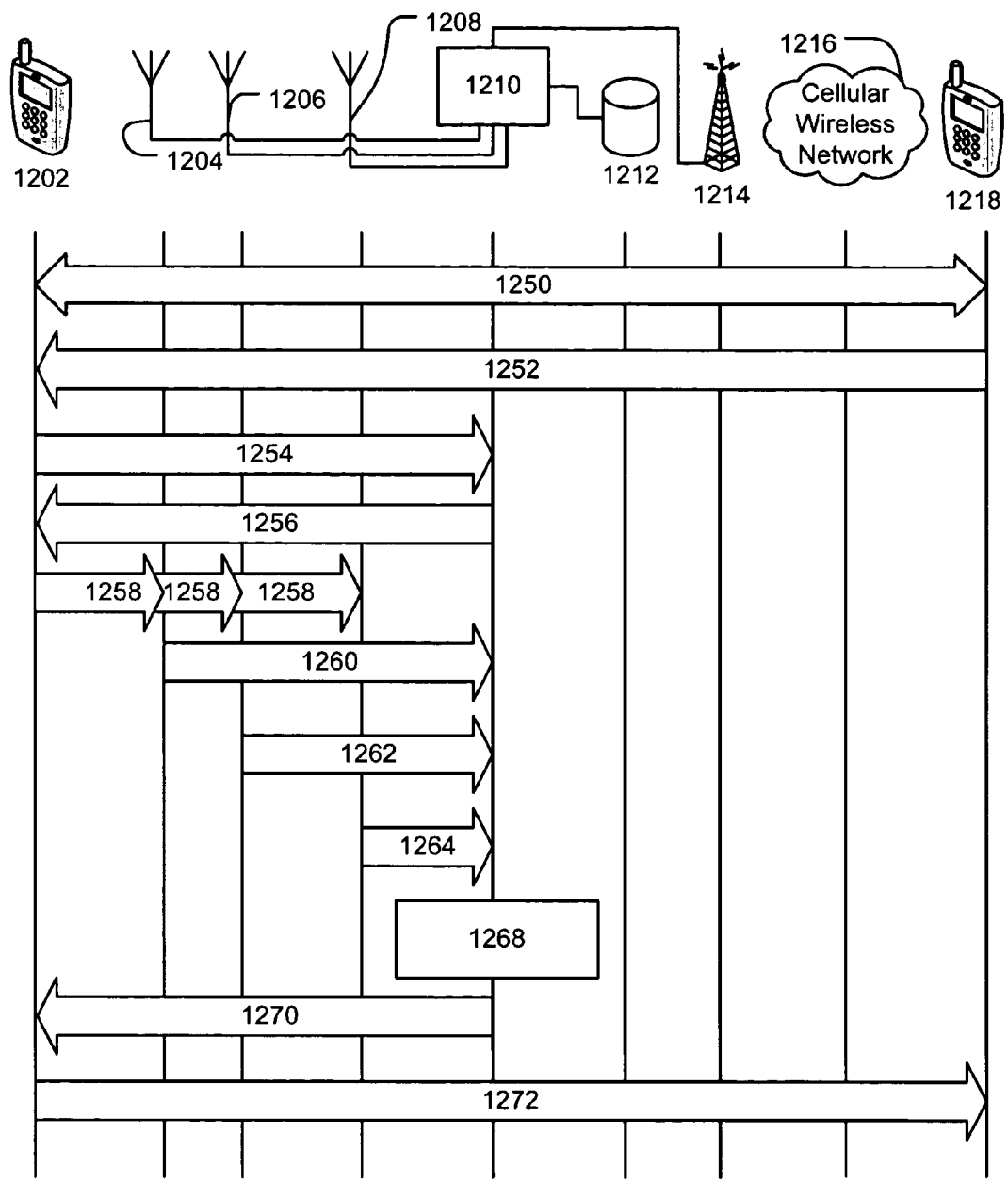
FIG. 12 is an exemplary messaging diagram showing communications between two mobile stations across a DAS communicatively linked with a cellular wireless network.

In an alternative embodiment, a foreign mobile station contacts a DAS mobile station to obtain the location of the DAS mobile station. FIG. 12 provides a messaging diagram of this alternative embodiment.

A DAS is defined by the plurality of antennas 1204-1208 that may be distributed throughout a building with known coverage areas. A DAS controller 1210 operates to control the activity of the antennas 1204-1208 and to manage communications with foreign networks such as a cellular wireless network 1216. The DAS controller 1210 also manages a location database stored in data storage 1212. An external antenna 1214 is coupled with the DAS controller 1214 and provides a connection node between the DAS and a foreign network such as a cellular wireless network 1216. A foreign wireless station 1218 is configured to communicate with the cellular wireless network 1216. Additionally, a DAS mobile station 1202 operates within the DAS and can communicate with the DAS controller through the antennas 1204-1208.

In the messaging, a call is established at step 1250 between the foreign mobile station 1218 and the DAS mobile station 1202. The call passes through the cellular wireless network 1216 and the DAS. During the call, the foreign mobile station 1218 requests the current location of the DAS mobile station 1202 within the DAS at step 1252. As one skilled in the art will understand, the request 1252 serves as a trigger to begin the process of obtaining the location information.

At step 1254, the DAS mobile station 1202 sends a DAS location request to the DAS controller 1210. According to the embodiment, the DAS location request informs the DAS controller 1210 that the DAS mobile station 1202 is requesting a determination of its location within the DAS. If the DAS controller 1210 is prepared to participate in the location operation then the DAS controller 1210 sends a DAS location request acknowledgement to the DAS mobile station 1202 at step 1256.

After receiving the acknowledgement, the DAS mobile station 1202 broadcasts a location message at step 1258. The location message may be a message specially designated for determining the location of the DAS mobile station 1202. Alternatively, the location message may simply be a portion of the call without any special location messaging properties.

Each antenna 1204-1208 receives the location message and forwards the message to the DAS controller 1210 for further processing at steps 1260-1264. Although three antennas 1204-1208 are shown in FIG. 12, that number is arbitrarily selected and may be smaller or much larger. Any number of antennas may be configured in the system. For example, if no antennas receive the location message then the DAS controller 1210 may determine that the DAS mobile station 1202 is not located within the DAS; if one antenna receives the location message then the DAS controller 1210 may determine that the DAS mobile station 1202 is located within the local coverage area of that one antenna; and if multiple antennas receive the location message (as shown in FIG. 12) then the DAS controller 1210 may determine that the DAS mobile station 1202 is located within the local coverage area of the antenna that received the strongest location message signal. These determinations by the DAS controller 1210 occur at step 1268.

Thus, at step 1268, the DAS controller 1210 determines which antenna received the strongest signal and then determines the location of the DAS mobile station 1202 based upon the local coverage area of the given antenna.

At step 1270, the DAS controller 1210 sends a location identifier to the DAS mobile station 1202 that contains an indication of the local (geographic) coverage area of the given antenna as a representation of the location of the DAS mobile station 1202. According to one embodiment, this message may be sent as an SMS message. The SMS message may appear as text such as "Jack Doe is calling from 6450 4th Floor, Area A". SMS messaging may be further incorporated into any of the mentioned embodiments. Messages may be sent through other protocols as well.

The DAS mobile station 1202 then sends a copy of the indication to the foreign mobile station 1218 at step 1272.

According to some embodiments, the local antennas serve simply as conduits for delivering the RF signal to a DAS controller (or LAC). Thus, unlike a BTS, the local antennas do not have substantive signal processing equipment. In this case, each antenna may be located within a common sector or PN offset. Thus, a macro network may believe that the entire DAS is within one sector.

In an alternative embodiment, however, a signal strength of the location message is calculated at a receiver module at each receiving antenna. Thus, instead of forwarding the location message to the DAS controller 1210 for processing, each antenna merely needs to forward the calculated signal strength. In order to determine the location of the DAS mobile station 1202, the DAS controller 1210 would then compare the calculated signal strengths.

In yet another embodiment a sending device (possibly on a foreign network) requests a location from a DAS mobile station. The DAS mobile station responds with an indication of its most current known location. This known location may be wrong because it may, for example, 1) be out of date; 2) reflect the location of a BTS rather than a DAS antenna; 3) reflect the location of the antenna in current communication rather than the closest antenna; or 4) reflect the location of an antenna rather than a coverage area. Thus, in this embodiment, in order to ensure correct location indication, a DAS controller (or LAC) is configured to intercept the location message sent from the DAS mobile station and replace any location data with its location data for the DAS mobile station.

Although only operation of a single DAS mobile station has been discussed it is expected that a plurality of mobile stations will operate within a DAS at any given time. Thus, each antenna may be receiving multiple signals at any one time—these signals coming from multiple mobile stations. According to an embodiment, a DAS controller is configured to computer signal strengths and determine location for each mobile station operating in the DAS.

4. Conclusion

A variety of embodiments have been described above. More generally, those skilled in the art will understand that changes and modifications may be made to these embodiments without departing from the true scope and spirit of the present invention, which is defined by the claims. For example, elements may be added or removed from the system architecture without eliminating usefulness of the embodiments.

I claim:

1. In a distributed antenna system of the type that includes a plurality of antennas each radiating to define a respective geographic coverage area in which a mobile station can communicate, wherein each of the antennas is communicatively linked with a controller via a respective receiver module, and the controller communicates over an air interface with a radio access network so as to provide connectivity between the antennas and the radio access network, a method comprising:

receiving, into a subset of the antennas, a signal from the mobile station;

measuring a strength of the signal received by each antenna of the subset of antennas by converting a radio-frequency version of the signal into a digital representation of the strength of the signal and operating one of the receiver modules to measure the signal strength of the signal received by the antenna;

comparing the strength of the signal received by each antenna of the subset of antennas to the strength of the signal received at each other antenna of the subset of antennas;

determining that the signal is strongest at a given one of the antennas;

establishing as a representation of a location of the mobile station an indication of the geographic coverage area of the given antenna; and transmitting the indication from the controller over the air interface into the radio access network, as a report of the location of the mobile station.

2. The method of claim 1, further comprising the controller performing at least the measuring, comparing, determining and establishing functions.

3. The method of claim 1, further comprising:
maintaining in the distributed antenna system a set of correlation data that correlates each antenna with an indication of the geographic coverage area of the antenna, wherein establishing as a representation of the location of the mobile station an indication of the geographic location of the given antenna comprises referring to the correlation data.

4. The method of claim 3, wherein referring to the correlation data comprises the controller referring to the correlation data.

5. The method of claim 1, wherein transmitting the indication from the controller into the radio access network comprises transmitting a short message service (SMS) message carrying the indication.

6. The method of claim 1, further comprising:
performing at least the measuring, comparing, determining and establishing functions periodically.

7. The method of claim 1, further comprising:
performing at least the measuring, comparing, determining, establishing and transmitting functions at least once during a call between the mobile station and a remote entity.

8. The method of claim 7, wherein transmitting the indication from the controller into the radio access network comprises transmitting the indication from the controller to the remote entity via the radio access network, whereby mobile station location information is available at the remote entity during a call.

9. The method of claim 8, further comprising:
performing at least the measuring comparing, determining, establishing and transmitting functions multiple times during the call.

10. The method of claim 1, further comprising:
performing the measuring, comparing and identifying functions in response to a directive from the mobile station.

11. The method of claim 10, further comprising:
receiving the directive in the form of dialed digits from the mobile station.

12. The method of claim 1, further comprising:
receiving a message at the controller from a sender requesting the report of the location of the mobile station, wherein transmitting the indication from the controller into the radio access network comprises sending a message into the radio access network directed to the sender.

13. The method of claim 1, further comprising:
storing the indication in data storage at the controller; and
wherein transmitting the indication further comprises:
retrieving the stored indication from data storage; and
transmitting the stored indication into the radio access network.

14. The method of claim 1, wherein the plurality of antennas are distributed within a multi-floor building, and wherein the indication of the geographic coverage area includes an indication of a floor within the coverage area.

15. The method of claim 1, wherein the representation of the location of the mobile station comprises a defined region on a map of the distributed antenna system.

16. A system comprising:
a plurality of antennas, each radiating to define a respective geographic coverage area;
a controller communicatively linked with the plurality of antennas, the controller communicating over an air interface with a radio access network so as to provide connectivity between the antennas and the radio access network for a mobile station; and
control logic within the controller for comparing a strength of a signal received by each antenna of the plurality of antennas to a strength of the signal received at each other antenna of the plurality of antennas, determining that a given one of the antennas has received a strongest signal from the mobile station and for transmitting into the radio access network, as a representation of a location of the mobile station, an indication of the geographic coverage area of the given antenna,
wherein each antenna is coupled with the controller via a respective receiver module, wherein the receiver converts a radio frequency version of the signal received by the antenna into a digital representation of a strength of the signal.

17. The system of claim 16, further comprising:
a set of correlation data that correlates each antenna with an indication of the geographic coverage area of the antenna,
wherein the control logic is arranged to reference the correlation data in order to determine the geographic coverage area of the given antenna.

18. The system of claim 16, wherein the control logic transmits the indication into the radio access network as a short message service (SMS) message.

19. The system of claim 16, wherein the control logic operates during a call between the mobile station and a remote entity.

20. The system of claim 19, wherein the control logic transmits the indication to the remote entity.

21. The system of claim 16, wherein the plurality of antennas are distributed within a multi-floor building.

22. The system of claim 21, wherein the indication of the geographic coverage area includes floor information.

* * * * *